United States Patent [19]

Hatch

[11] 4,208,600

[45] Jun. 17, 1980

[54] DISK/DRUM ACYCLIC MACHINE

[75] Inventor: Burton D. Hatch, Ballston Lake, N.Y.

[73] Assignee: General Electric Company, Schenectady, N.Y.

[21] Appl. No.: 898,923

[22] Filed: Apr. 21, 1978

[51] Int. Cl.² .......................................... H02K 31/00
[52] U.S. Cl. .................................... 310/178; 310/219; 310/268
[58] Field of Search ............... 310/178, 248, 219, 268, 310/112, 266, 114; 322/48; 318/253

[56] References Cited

U.S. PATENT DOCUMENTS

| 3,293,470 | 12/1966 | Polgreen | 310/178 |
|---|---|---|---|
| 3,453,467 | 7/1969 | Harvey | 310/178 |
| 3,585,398 | 6/1971 | Harvey | 310/178 |
| 3,586,894 | 6/1971 | Mueller | 310/178 |
| 3,705,995 | 12/1972 | Chabrerie | 310/178 |
| 3,743,874 | 7/1973 | Chabrerie | 310/178 |
| 3,944,865 | 3/1976 | Jewitt | 310/178 |
| 3,989,968 | 11/1976 | Hatch | 310/178 |
| 4,097,758 | 6/1978 | Jenkins | 310/178 |

FOREIGN PATENT DOCUMENTS

| 1266621 | 3/1972 | United Kingdom | 310/178 |
|---|---|---|---|
| 1332786 | 10/1973 | United Kingdom | 310/178 |
| 471633 | 5/1975 | U.S.S.R. | 310/219 |

Primary Examiner—R. Skudy
Attorney, Agent, or Firm—Nathan D. Herkamp; Joseph T. Cohen; Paul R. Webb, II

[57] ABSTRACT

A high power density acyclic machine is described which comprises a plurality of high current density field coils, a series drum and disk arrangement using liquid metal collectors, and shielding members as armature conductor material. The machine achieves maximum flux utilization by providing a plurality of disks connected in series and intersecting the magnetic flux of the field coils, and a drum connected in series between sets of disks also intersecting the flux from the field coils.

37 Claims, 5 Drawing Figures

DISK/DRUM ACYCLIC MACHINE

BACKGROUND OF THE INVENTION

This invention relates to acyclic machines, and more particularly to such machines utilizing a plurality of high current density field coils, such as superconducting field coils.

A coaxial disk stack acyclic machine is described in U.S. patent application Ser. No. 710,926, filed Aug. 2, 1976 by Jenkins, now U.S. Pat. No. 4,097,758, and assigned to the assignee of the instant application. In that application is disclosed a machine which utilizes a stack of coaxial disks to cut magnetic flux on both the radially-inner and radially-outer sides of a conventional field coil.

A multiple drum-type machine is disclosed in U.S. Pat. No. 3,579,005, issued May 18, 1971 to Noble. That machine includes multiple coaxial field coils and multiple coaxial drums. Liquid metal collectors are known in the prior art as exemplified in U.S. Pat. No. 4,027,184, issued on May 31, 1977 to Hurley and in U.S. patent application Ser. No. 876,570, filed Feb. 10, 1978 by the instant inventor, and U.S. Pat. No. 3,211,936, patented Oct. 12, 1965 to Harvey, all assigned to the assignee of the instant application.

A homopolar dynamoelectric machine using superconducting field coils is disclosed in U.S. Pat. No. 3,944,865, issued Mar. 16, 1976 to Jewitt. That patent discloses using two rotors of cylindrical drum form, one interior of the field coils and one exterior of the field coils to utilize the magnetic field of the superconducting coils.

In marine applications, strict limitations are imposed upon machine size and weight. In the invention disclosed herein, by utilizing high current density field coils a high density magnetic field can be created with the minimum physical size. By using a homopolar machine construction, the shielding iron of the machine is used simultaneously as armature conductors for the magnetic field. This combination of high current density field coil and homopolar construction enables minimizing physical size of a shielded machine. To achieve maximum output torque from such a construction requires maximum utilization of the high strength magnetic field generated by the high density current flow through the coils.

Accordingly, the primary object of the present invention is to maximize utilization of the high magnetic flux density available in a machine using high current density coils to provide a high power density, e.g. in horsepower per pound, machine. A further object is to minimize the Lorentz expulsion force applied to liquid metal in liquid metal current collectors of such a machine.

DESCRIPTION OF THE INVENTION

The invention of the instant application achieves the above objectives by combining the use of multiple axially-extending high current density field coils and at least one disk/drum/disk combination intersecting the field generated by those coils.

The multiple field coils are in spaced, coaxial relationship and are energized to have opposed poles. In such a machine are n field coils; n stacks of radially-extending rotor-mounted circular disks; n stacks of stator-mounted circular disks interleaved on a one-for-one basis with the rotor-mounted disks, and n−1 axially-extending drums, each drum being connected between a pair of stacks of rotor-mounted disks and in juxtaposition with the space between a pair of adjacent coils.

Because of the polar opposition of adjacent coils, two magnetic fields are additive in the region of each drum, and each line of flux passing through a drum will, in general, also pass through a stack of disks before returning to the opposite end of the emanating coil. Complementarily-shaped stator and rotor structures with liquid metal current collectors forming a series connection between adjacent rotor and stator disks in series with the drum create a single current path through the machine.

To further enhance utilization of the available magnetic field, the shielding members of the machine function as armature conductors as well as shielding members. With the above-described structure, the invention of the instant application optimizes utilization of high current flow in the field coils and the associated high magnetic flux density. Since each element of the magnetic flux path which passes through a drum will, then for the most part, pass through a stack of disks, the maximum utilization of the available field is accomplished. In this way, the drum section of the machine adds to the torque producing capability of the machine in a way similar to adding disks to the rotor and the stator structure.

To effectively utilize the high current capabilities of a machine of the type described, liquid metal current collectors are required. The machine of the instant invention exerts minimum Lorentz expulsion forces on the liquid metal in liquid metal current collectors between the stator disks and rotor disks by providing a single series current path through the machine.

BRIEF DESCRIPTION OF THE DRAWINGS

The features of the invention believed to be novel and unobvious over the prior art are set forth with particularity in the appended claims. The invention itself, however, as to organization, method of operation and objects and advantages thereof, may best be understood by reference to the following description taken in conjunction with the accompanying drawings wherein:

MANNER AND PROCESS OF MAKING AND USING THE INVENTION

The particular machine shown in FIGS. 1 through 5 and described herein is merely exemplary, and the scope of the invention is defined in the claims.

Figure 1:
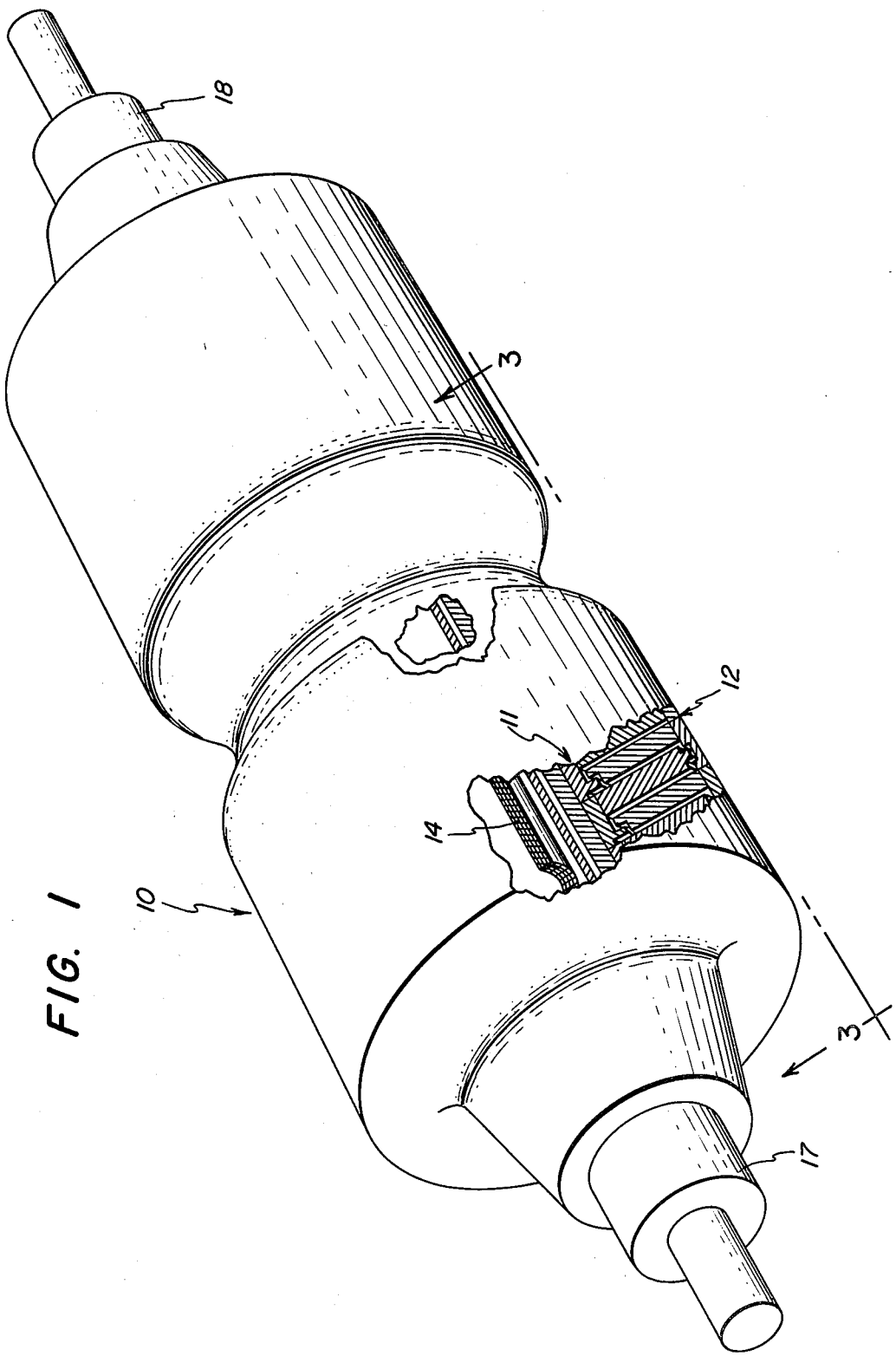
FIG. 1 is a perspective view of a machine showing the relationship of parts schematically with a broken-out section to show the relationship of certain internal parts.
Figure 2:
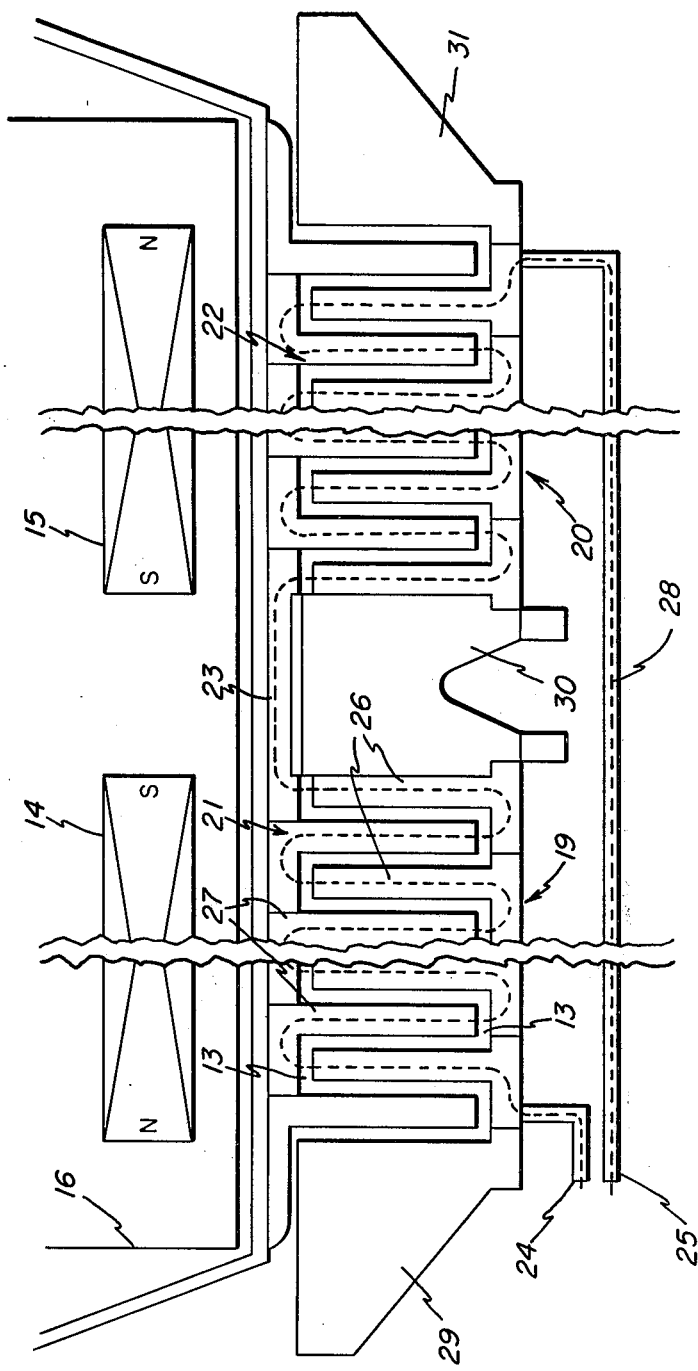
FIG. 2 is a schematic cross-sectional view of half of the machine of FIG. 1, with portions omitted, taken along a plane passing through the axis.

The machine 10 illustrated herein is a quadrupole high current density field coil machine, a shown in FIGS. 1 and 2. The machine 10 comprises rotor 11 and stator 12, electrically joined by collectors 13. Within the rotor are field coils 14 and 15 within a dewar 16. In a preferred embodiment as shown in FIGS. 2-5 the field coils 14 and 15 are superconducting field coils of known materials. However, the same structure may be used to supercool copper or aluminum coils to the temperature range of liquid nitrogen to provide high current density capability. Between the rotor 11 and stator 12 are bearings 17 and 18 both of conventional construction.

Current connection between adjacent stator disks and rotor disks is provided by appropriate liquid metal current collectors designated generally by numeral 13. The collectors could be of the type disclosed in U.S. Pat. No. 4,146,807, issued Mar. 27, 1979 to instant inventor and assigned to the assignee of the instant application, or of the type disclosed in U.S. patent application Ser. No. 878,786, filed Feb. 17, 1978 of Marshall and assigned to the assignee of the instant application, both of the applications incorporated herein by reference. Each field coil 14 and 15 has disposed therearound a stack, or set, 19 and 20 of stator disks 26, and a stack, or set, 21 and 22 of rotor disks 27. The disks 26 and 27 may be made of highly conductive material such as copper or copper alloys, or may be made of low magnetic reluctance, electrically conductive material, such as iron or alloys thereof. In the preferred embodiment shown the disks 26 and 27 are made of an iron alloy. As shown, each stack of stator disks is interleaved with a stack of rotor disks and a rotor drum 23 of electrically conductive material is disposed between the two stacks 21 and 22 of rotor disks.

Figure 3:
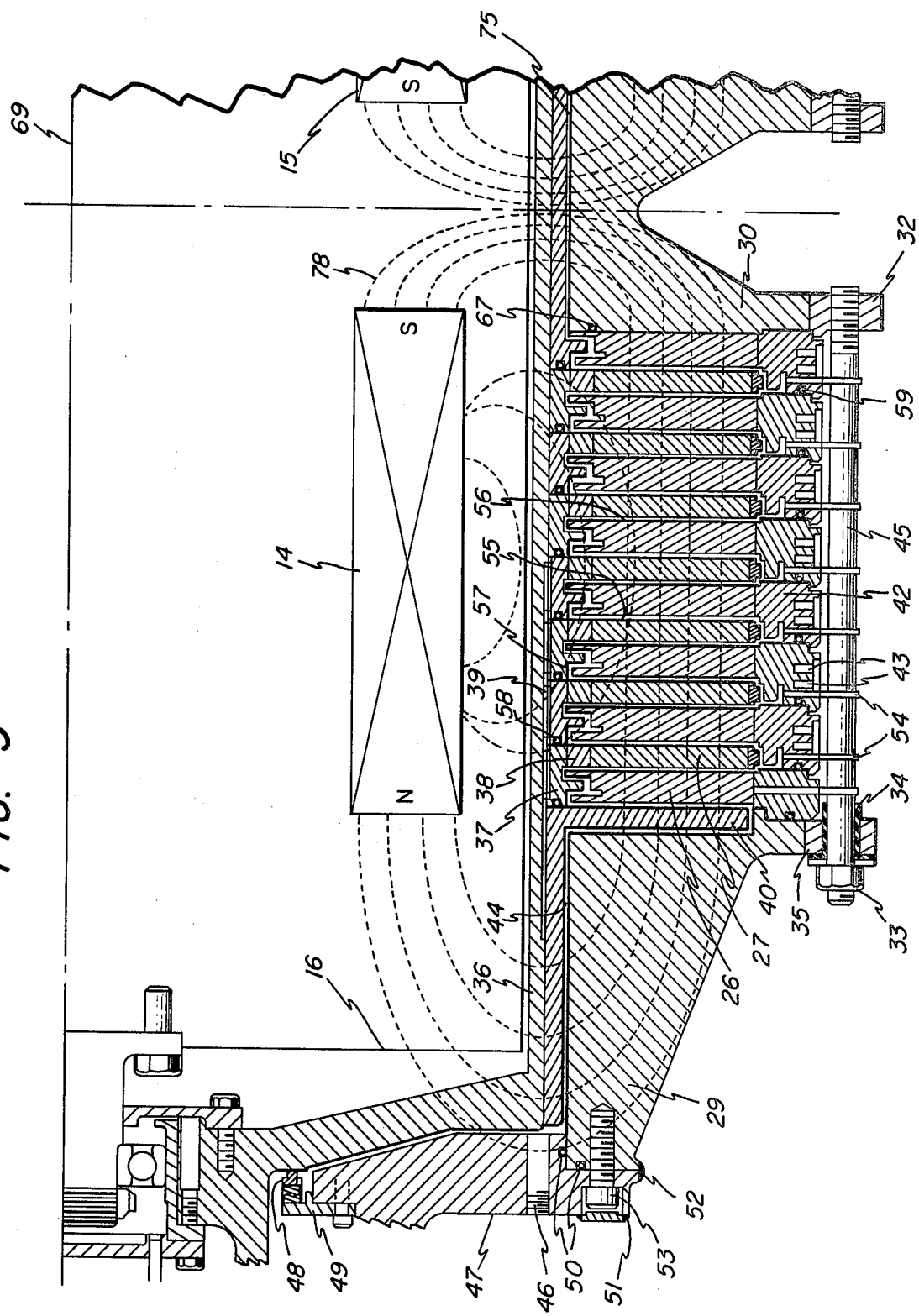
FIG. 3 is an enlarged sectional view schematically illustrating parts of the machine, taken along line 3—3 of FIG. 1.

Each field coil 14 and 15 generates a high density magnetic field shown by flux lines 78 in FIG. 3, having a generally axially-directed component passing through said disk stacks 19, 21 and 20, 22, respectively, and a generally radially-directed component passing through the drum 23. Since the field coils are energized to have poles in opposition, as shown, the fields in the region of the drum 23 are additive.

As shown in FIG. 2, the current path is from terminal 24 through the rotor and stator disk stacks 21 and 19, respectively, surrounding field coil 14, through the drum 23 and through the other sets of rotor and stator disks 22 and 20, respectively, to a second terminal 25 of the machine. Each of the stator disks 26 is connected in series with the adjacent rotor disks 27 to form a single current path by use of liquid metal collectors 13.

The use of series connections between the disks of the rotor and the stator provides a one-turn path so that the Lorentz expulsion force applied to the liquid metal in the current collector assemblies, to be described hereinafter, is limited to that created by the current flow in a single loop 28.

The stator comprises magnetic, shielding sections 29 and 47, the first stack 19 of stator disks 26, secured to conductive rings 42, center magnetic, shielding section 30, and second stack 20 of stator disks 26, secured to magnetic shielding section 31. The magnetic shielding sections 29, 30 and 31 are shaped to provide adequate shielding and minimum weight. For example, the section 30 has a narrow center portion and wider end portions to correspond to the cross-section required by the flux of the magnetic fields without adding unnecessary weight. Each of the stacks 19 and 20 of stator disks 26 is secured by a plurality of bolts 45 threaded into a nonmagnetic extension 32 of shielding section 30 on one end of the stack, and secured at the other end of the stack by nut 33. The bolts 45 pass through insulating sleeves 34 in nonmagnetic extension 35 of the stator shielding member 29. By adding nonmagnetic extensions 32 and 35 to the stator shielding sections 30 and 29, respectively, leakage of magnetic flux from the shielding members is reduced.

The rotor comprises a hollow cylindrical shaft 36 with rotor disk stacks 21 and 22 mounted thereon via conductive rotor collector rings 37 and rings 38. Each rotor collector ring 37 is secured by a key 39 in an appropriate keyway in the rotor shaft 36. The elongated drum section 23 extending between the two sets of concentric rotor disks 21 and 22 incorporates a rotor collector ring 37 at each end thereof. Conductive rotor collector rings 37 are made of high electrical conductivity material, such as copper and copper alloys. Rings 38, welded to collector rings 37, may be made of highly conductive material, such a copper or copper alloys, or, as in the preferred embodiment shown, of low magnetic reluctance, electrically conductive material, typically iron. The drum 23 may be either highly conductive material, such as copper or copper alloys, or may be low magnetic reluctance, electrically conductive material, such as iron or iron alloys. End disks 40 are dummy disks not connected into the series connection, and their function will be described, below, in the discussion of best mode of practicing this invention.

Within the hollow shaft 36 of the rotor is an insulating dewar 16 containing a pair of high current density field coils 14 and 15 at a suitably low temperature. One end of the dewar is secured within the hollow rotor shaft 36 by an appropriate bearing means 41 and at the other end is secured to the fixed housing member 31 by the bearing means 18. Dewar 16 is stationary to simplify the circulation of coolant thereto and the bringing of electrical leads to the field coils.

As shown in FIG. 3, the concentric disks 26 of the stator stacks 19 and 20 are connected to conductive stator collector rings 42. These stator collector rings 42 have cooling passages 43 passing therethrough, through which coolant liquid is circulated via an external pump (not shown).

Between the members of the rotor 11 and the juxtaposed members of the stator 12 is a gap 44. A thrust bearing (not shown) of conventional construction is included in bearing 17 to maintain the axial gaps between the stacks 21 and 22 of rotor disks and stacks 19 and 20 of stator disks, respectively. The gap 44 provides mechanical clearance for the rotation of the rotor 11, and further, provides access through which liquid metal may be supplied to the machine for completion of the current loop 28 through the rotor and stator members.

Liquid metal is supplied through an orifice 46 in shielding member 47 of the stator 12. The gap 44 is sealed at one end by seals 48 and 49 of conventional construction. At the opposite end the gap is sealed by conventional seals (not shown). The shielding members 47 and 29 are sealed against liquid metal leakage by O-rings 50 and welds 51, 52 around screw 53 securing the members 47 and 29 together. Leakage of liquid metal is prevented by O-rings 58 between each of the rotor collector rings 37 and by O-rings 59 between each pair of stator collector rings 42 and by O-ring 67 between the innermost stator disk 26 and shielding member 30. Normally closed drains 54 are provided in the stator collector rings 42 for removal of liquid metal from the machine.

Between stator disks 26 and rotor disks 27 insulation is provided by a layer of insulating material 55, such as alumina, covering one side of each rotor disk and layer 56 covering one side of each stator disk as shown in FIG. 3. The insulation layer 55 on each rotor disk 27 extends around the circumferentially outer edge of the rotor disk and along the side of the rings 37 and 38 to provide electrical insulation between adjacent rotor rings. The insulating layer 56 on the stator disks extends around the end of each stator disk as shown in FIG. 3 and beyond the stator disk 26 to one side of the stator collector rings 42 to provide complete electrical insulation between the stator disks. On the conductive rotor collector rings 37 an insulating layer 57 covers the area adjacent the stator ring not insulated by stator insulating layer 56. By this means the rotor and the stator are electrically insulated from each other in the region of the disks. Insulating layer 56 on the stator disk adjacent the shielding member 30 and an insulating layer 75 applied to the inner cylindrical surface of shielding member 30 prevent any current flow through shielding member 30.

Figure 4:
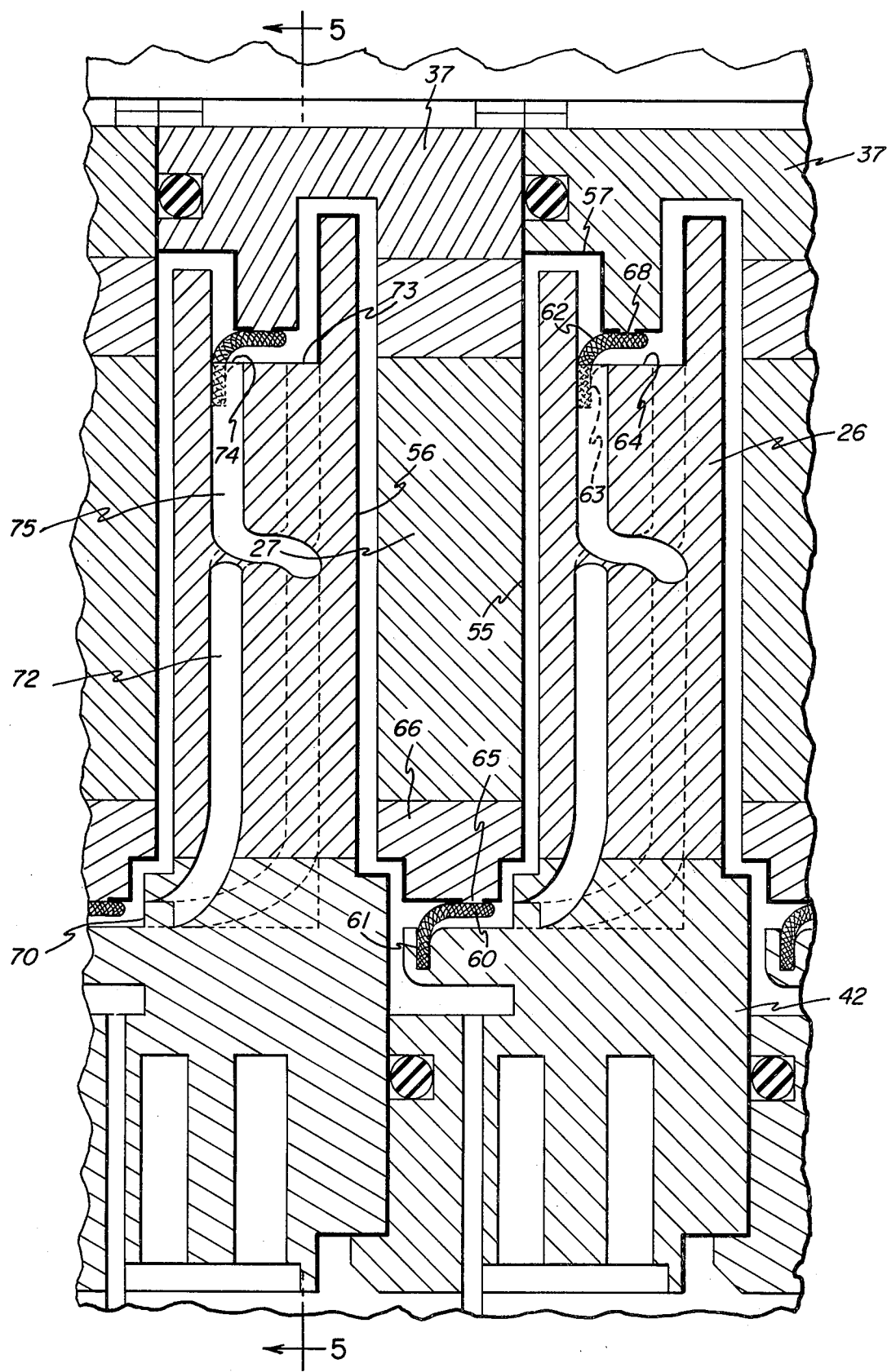
FIG. 4 is an enlarged detailed sectional view of a pair of rotor and stator disks along with liquid metal current collectors.

As shown in FIG. 4 the current collector means 13 incorporates a compliant conductive metal filament brush 60 in a groove 61 in the stator collector ring 42 and a compliant conductive metal filament brush 62 in an appropriate groove 63 in the inner circumferential surface 64 of the stator disks 26. The brushes 60 form continuous conductive rings around the rotor disks 27, and the brushes 62 form continuous conductive rings around the rotor collector rings 37. To complete contact between the stator collector rings 42 and the rotor disks 27, a narrow annular opening 65 is formed in the insulating layer 55 around the rotor disks 27. The narrow opening 65 is provided, so that the radially-directed component of the generally axially-directed magnetic field is kept small in the region of opening 65. This minimizes the electromotive force differential across the opening 65. The surface of contact between opening 65 and brush 60 may be tilted to further reduce the electromotive force differential as described in U.S. patent application Ser. No. 876,570, filed Feb. 10, 1978, by the instant inventor and assigned to the assignee of the instant invention and incorporated herein by reference.

Contact between the rotor collector rings 37 and the stator disks 26 is provided by the brushes 62 and narrow, annular opening 68 in the insulation 57 on the rotor collector rings 37. Annular opening 68 performs the same function as opening 65. Liquid metal, such as mercury or sodium-potassium NaK) alloy, is provided to each of the brushes 60 and 62 around the periphery thereof to ensure adequate current carrying capacity between the rotor disks 27 and stator disks 26. By this combination a single series current path 28 is provided through the rotor and stator to the outside terminals 24 and 25.

This machine can be operated fully flooded, i.e., with liquid metal filling the gap 44 to such an extent that the opening 68 and insulating layer 57 on rotor collector rings 37 are maintained immersed. The machine, alternatively, can be provided with liquid metal circulation means as disclosed in U.S. patent application Ser. No. 924,055, filed July 12, 1978, of the inventor of the instant invention and assigned to the assignee of the instant invention. By operating in the fully flooded condition as described above or with liquid metal circulation means, a complete annular interface of liquid metal is provided between adjacent stator and rotor disks to ensure adequate current carrying cross-section regardless of machine rotational speed. By limiting the Lorentz expulsion force experienced by liquid metal in the current collectors, the brushes are prevented from running dry and losing the high current carrying capacity provided by the liquid metal.

The combination of rotor disks and drum as described provides maximum utilization of the high flux density provided by field coils 14, 15. In the preferred embodiment shown in FIGS. 3, 4 and 5, the machine of the instant invention maximizes the field utilization by using the magnetic sections of the rotor disks and stator disks as magnetic shields as well as armature current conductor elements and as structural elements.

In operation as a motor, field coils 14 and 15 are energized, introducing magnetic fields in shielding members 47, 29, 30 and 31, rotor disks 27 and stator disks 26 and rotor drum 23. A source of potential is connected to the terminals 24 and 25 to produce current flow through the stator 12 and rotor 11 of the machine. Torque is produced as a result of the current flow in the magnetic field provided by the coils 14 and 15, such torque tending to rotate the rotor shaft in a direction determined by the polarity of the potential applied between the terminals. The amount of torque produced is determined by the value of current applied, the magnetic field strength and the number of rotor disks connected together. Use of the drum 23 in the location between field coils 14, 15 having their poles in opposition adds to the torque produced by the machine, due to its location in the area where the magnetic fields of the coils 14 and 15 are additive. This provides for maximum utilization of the magnetic field which cannot be equally achieved by a conventional disk dipole machine.

In operation as a homopolar generator, field coils 14 and 15 are energized and rotor shaft 36 is rotated by an external prime mover (not shown) causing motion of the rotor 11 about the axis of rotation 69. The rotor disks 27 and drum 23 cut the flux emanating from coils 14 and 15. As a result, a radially-directed voltage is established in each of the rotor disks 27 and an axially-directed voltage is established in the drum 23. By virtue of the arrangement of the liquid metal collectors 13 and the insulation between rotor disks 27 and stator disks 26, all the voltages are connected in series-aiding fashion. By connecting an external load (not shown) across terminals 24 and 25 a current following the dotted line path 28 may be generated to pass through the load. In the machine of the instant invention, maximum utilization of the available flux to produce current is provided by the disk/drum/disk arrangement cutting the flux passing outside the field coils. When energized to provide opposing poles, the flux between the coils is additive, and therefore the drum utilizes flux from both of the field coils.

Although the disclosure of the instant invention herein is described, relative to the quadrupole machine, it is equally applicable to hexapole, octapole or larger arrangements of high current density coil machines. The arrangement of the instant invention provides optimum utilization of the magnetic field from adjacent high current density coils energized to have opposed poles by employing a disk/drum/disk type construction as disclosed.

Best Mode

Figure 5:
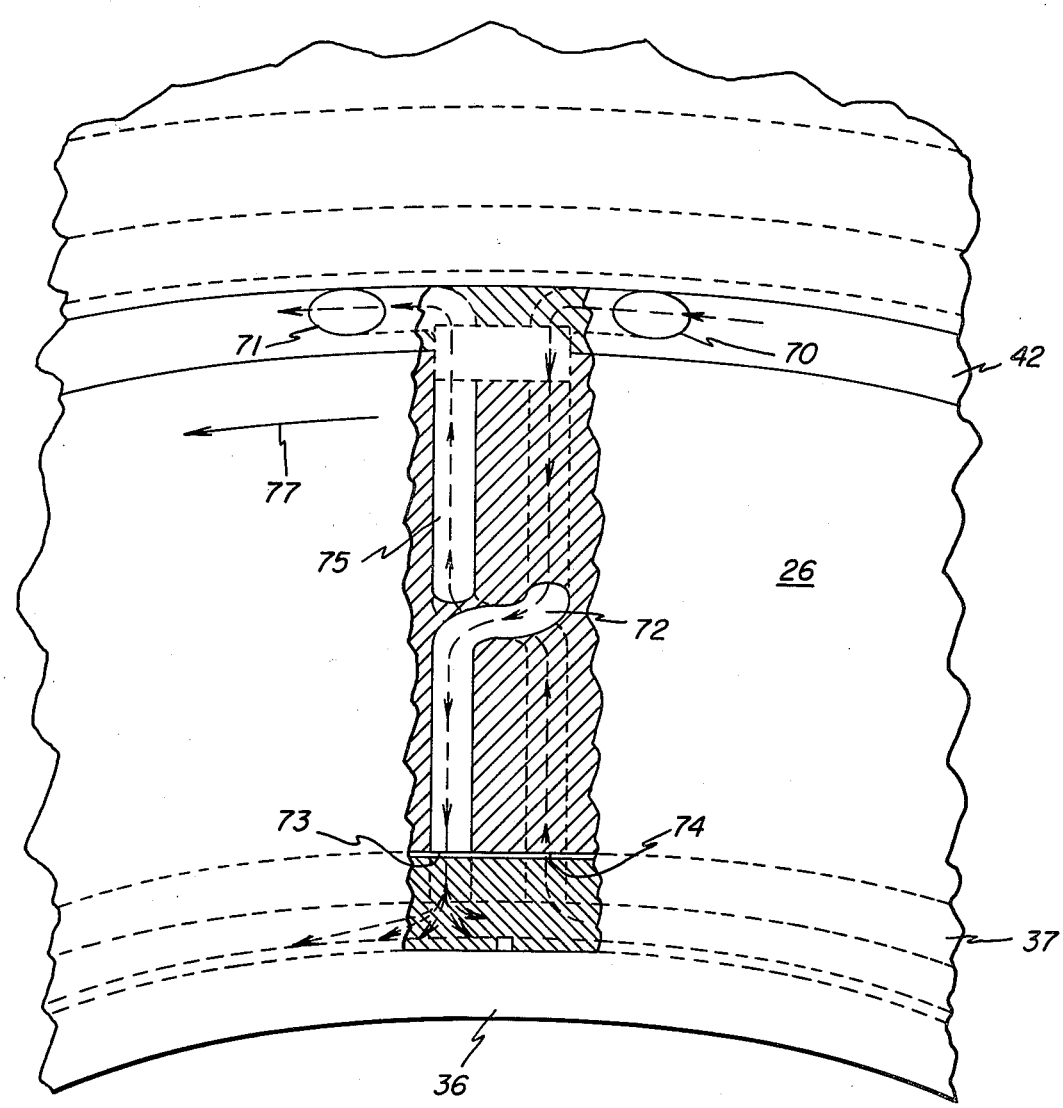
FIG. 5 is an enlarged cross-sectional view taken along line 5—5 of FIG. 4.

As illustrated in FIGS. 4 and 5, the best mode of the instant invention contemplated includes, in addition to the preferred aspects of the quadrupole machine described hereinabove, such as superconducting field coils, the use of a circulation path for liquid metal between adjacent current collectors on the same stator disk as described in the aforementioned Hatch application Ser. No. 924,055. The liquid metal used is a sodium-potassium alloy (NaK). Magnetic steel is used for the stator disks 26 and rotor disks 27 and a conductive metal ring 66 is attached to the outer circumferential surface of each rotor disk 27. The conductive ring 66 is made of highly conductive metal such as copper. In this way accommodation is made both for the entry of high density current through narrow annular opening 65 and for the distribution of this high density current to the full cross-section of the rotor disk 27. The rotor disk 27 is able to carry the high current required with very low electrical losses, due to the fact that its cross-sectional area is much larger than the area of opening 65.

With the direction of rotor rotation shown by arrow 77 openings 70 and openings 71 in the stator collector ring 42 serve as liquid metal inlets and outlets, respectively. The opening 70 is in communication with the radial passage 72 extending through the stator disk. At the opposite end passage 72 has an opening 73 in the inner circumferential surface 64 of stator disk 26. Adjacent the inner brush 62 is an opening 74 leading to a second radial passage 75 in communication with opening 71.

When the machine is operating in the direction of rotation shown, liquid metal enters opening 70 and is forced through passage 72 to the brush 62 from the outer brush 60. Liquid metal returns from brush 62 to brush 60 through passage 75 to form a complete circulation path. Metal is pumped by rotation of the machine and the magnetic forces applied to the liquid metal due to the current flowing through the rotor and stator disks. Thereby, adequate liquid metal is maintained between the conductive rotor collector ring 37 and the brush 62 and also maintained between the conductive rotor collector ring 66 and brush 60. By passing through the passages 72 and 75 the liquid metal is separated from the gas filling the volume of the gap 44 not filled by liquid metal.

When the direction of the machine rotation is reversed, the flow of liquid metal is in the opposite direction, and opening 70 becomes an outlet, and opening 71 becomes an inlet for the liquid metal from the brush 60. A plurality of liquid metal circulation paths as described (e.g. four) uniformly spaced around the circumference of each stator disk, is provided for the machine to maintain uniform and constant electrical contact between the stator disks and rotor disks.

A rotor disk 40 on each end of rotor 11 serves to provide centrifugal pumping of the liquid metal through the circulation path, as described in U.S. patent application Ser. No. 924,655 mentioned above, in the first stator disk. The rotor disks 40 are electrically dummy disks. They do not contribute to the generation of torque when the machine is operating as a motor, or to the generation of voltage when the machine is operating as a generator. There is no electrical connection between disks 40 and the stator 12.

The foregoing describes an acyclic machine of disk/-drum/disk type. By providing this structure maximum utilization of the high flux density available when using high current density coils is provided. When the machine functions as a motor, a high output torque is provided due to the increased number of members, i.e. the disks and drum, intersecting the flux. When operating as a generator, a high output voltage is provided for the same reason.

While preferred features and the best mode of the invention have been shown, many modifications and changes will occur to those skilled in the art. It is, therefore, to be understood that the appended claims are intended to cover all such modifications and changes as found within the true spirit of the invention.

I claim:

1. A high power density acyclic machine comprising in combination:

rotor means comprising:
   a hollow rotatable shaft;
   a first plurality of spaced electrically conductive rotor disks concentric with said shaft and affixed thereto in a first axial stack;
   a second plurality of spaced electrically conductive rotor disks concentric with said shaft and affixed thereto in a second axial stack;
   and an electrically conductive drum located between and concentric with said first and second stacks;

stator means comprising:
   a hollow fixed shielding member of low magnetic reluctance material concentric with and surrounding said rotatable shaft at each end of said shaft;
   a first plurality of spaced electrically conductive stator disks interleaved with said first plurality of rotor disks, said first plurality of stator disks being concentric with said fixed shielding member and affixed thereto in a third axial stack;
   a second plurality of spaced electrically conductive stator disks interleaved with said second plurality of rotor disks, said second plurality of stator disks being concentric with said fixed shielding member and affixed thereto in a fourth axial stack; and
   a hollow sleeve of low magnetic reluctance material located between and connected to said third and fourth stacks, said sleeve being concentric with and surrounding said drum; said stator means and said rotor means being separated throughout by a gap;

a plurality of electrically conductive liquid metal current collectors interconnecting said interleaved disks of said first and third stacks, said drum and said interleaved disks of said second and fourth stacks in a single series electrical connection; and means disposed within said hollow rotatable shaft for establishing a magnetic field passing generally axially through each of said pluralities of disks and passing generally radially through said drum.

2. The machine of claim 1 wherein the means for establishing a magnetic field comprises two coils of superconducting material located radially inside said rotatable shaft and axially aligned with said first and second stacks, surrounded by an insulating dewar.

3. The machine of claim 1, wherein the disks of each of said stacks are made of low magnetic reluctance, electrically conductive material.

4. The machine of claim 3, wherein the rotor disks, the stator disks and the drum are made of a material selected from the group consisting of iron or magnetic steel.

5. The machine of claim 3, wherein the drum is made of a material selected from the group consisting of copper or a copper alloy, and the rotor disks and the stator disks are made of a material selected from the group consisting of iron or magnetic steel.

6. The machine of claim 1, wherein the current collectors include liquid metal circulation means for maintaining the collectors immersed in liquid metal.

7. The machine of claim 6, wherein each of the current collectors comprises:
a first collector ring surrounding and attached to the outer periphery of a rotor disk;
a second collector ring attached to the inner periphery of a stator disk, encircling and spaced from said first collector ring;
a compliant brush of electrically conductive filaments attaches to said second collector ring, said brush being closely adjacent said first collector ring; and
liquid metal situated between, and in contact with said brush, said first collector ring and said second collector ring.

8. The machine of claim 7, wherein a current collector in electrical connection with the inner periphery of each stator disk and a current collector in electrical connection with the outer periphery of the same stator disk are in fluid communication through radial passages in said stator disk to provide a closed path for circulation of the liquid metal from said collector on the outer periphery through one said passage to said collector on the inner periphery and back to the collector on the outer periphery through another of said radial passages.

9. The machine of claim 8, further comprising a dummy rotor disk attached to each stack of said rotor disks to provide liquid metal circulation to the current collectors attached to a stator disk on an end of each of said stacks of stator disks.

10. The machine of claim 1, further comprising a single fill orifice in said fixed shielding member for supplying liquid metal to the gap.

11. The machine of claim 1, wherein a layer of electrical insulation is affixed to one side of each disk of each stack of the interleaved stacks.

12. The machine of claim 11, wherein the insulation is alumina.

13. The machine of claim 11, wherein a layer of electrical insulation is affixed to the surface of each shielding member in juxtaposition to the ends of said rotor shaft and to the surface of said hollow sleeve in juxtaposition with said drum.

14. The machine of claim 13 wherein the insulation is alumina.

15. The machine of claim 1, further comprising extensions of nonmagnetic material attached to each said shielding member and at each end of said sleeve at the circumferentially-outer surface of said shielding members and said sleeve.

16. The machine of claim 15, wherein each of said stacks of stator disks is secured by a plurality of bolts passing through said extensions.

17. The machine of claim 1, wherein said fixed shielding members are formed of magnetic steel.

18. The machine of claim 1, wherein the liquid metal current collectors include sodium-potassium alloy as the liquid metal.

19. The machine of claim 1, wherein the liquid metal is supplied to the current collectors by flooding of the gap.

20. A high power density acyclic machine comprising in combination:
a plurality of stationary magnetic field generating coils, said coils being in a spaced, coaxial arrangement and adjacent coils electrically connected to a power source to be in polar opposition;
a rotor comprising:
a hollow rotor shaft, said coils being disposed within said shaft,
a plurality of stacks of radially-extending electrically conductive circular rotor disks mounted on said shaft and rotatable therewith, one of said stacks of rotor disks being in juxtaposition with each of said coils,
an electrically conductive cylindrical member disposed between and electrically connected to each pair of adjacent stacks of rotor disks,
a stator comprising:
a hollow fixed shielding member of low magnetic reluctance material concentric with and surrounding said rotatable shaft at each end of said shaft;
a plurality of stacks of radially-extending electrically conductive circular stator disks, each stack of stator disks being interleaved with a stack of rotor disks,
a hollow sleeve of low magnetic reluctance material located between and connected to each adjacent pair of stacks of stator disks, concentric with and surrounding each said cylindrical member, said stator and said rotor being separated throughout by a gap; and
a plurality of electrically conductive liquid metal current collectors interconnecting said interleaved disks in a single series electrical connection.

21. The machine of claim 20, wherein each of the magnetic field generating coils comprises a coil of superconducting material.

22. The machine of claim 21, wherein the disks of each of said stacks are made of low magnetic reluctance, electrically conductive material.

23. The machine of claim 22, wherein the rotor disks, the stator disks and the drum are made of iron or a material selected from the group consisting of magnetic steel.

24. The machine of claim 22, wherein the drum is made of a material selected from the group consisting of copper or a copper alloy, and the rotor disks and the stator disks are made of a material selected from the group consisting of iron or magnetic steel.

25. The machine of claim 20, wherein the liquid metal current collectors include a sodium-potassium alloy as the liquid metal.

26. The machine of claim 20, wherein each of the current collectors comprises:
a first collector ring surrounding and attached to the outer periphery of a rotor disk;
a second collector ring attached to the inner periphery of a stator disk, encircling and spaced from said first collector ring;
a compliant brush of electrically conductive filaments attached to said second collector ring, said brush being closely adjacent said first collector ring; and
liquid metal situated between, and in contact with said brush, said first collector ring and said second collector ring.

27. The machine of claim 26, wherein the liquid metal is supplied to the current collectors by flooding of the gap.

28. The machine of claim 26, wherein the current collectors are maintained immersed by the liquid metal by liquid metal circulation means.

29. The machine of claim 28, wherein a current collector located on the inner periphery of each stator disk and a current collector located on the outer periphery of the same stator disk are in fluid communication through radial passages in said stator disk to provide a closed path for circulation of the liquid metal from said collector on the outer periphery through one said passage to said collector on the inner periphery and back to the collector on the outer periphery through another of said radial passages.

30. The machine of claim 29, further comprising a dummy rotor disk attached to one end of each stack of said rotor disks to provide liquid metal circulation to the current collectors attached to a stator disk on an end of each stack of stator disks.

31. The machine of claim 20, further comprising a single fill orifice in said fixed shielding member for supplying liquid metal to the gap.

32. The machine of claim 20 wherein a layer of electrical insulation is affixed to one side of the disks of each stack of the interleaved stacks.

33. The machine of claim 32, wherein the insulation is alumina.

34. The machine of claim 32, wherein a layer of electrical insulation is affixed to the surface of each said shielding member in juxtaposition to each end of said rotor shaft and to the surface of each said hollow sleeve in juxtaposition with each said cylindrical member.

35. The machine of claim 34, wherein the insulation is alumina.

36. The machine of claim 7, further comprising terminals attached to one said second collector ring at each axial end of said machine.

37. The machine of claim 26, further comprising terminals attached to one said second collector ring at each axial end of said machine.

* * * * *